United States Patent
Kinoshita et al.

(10) Patent No.: US 10,486,981 B2
(45) Date of Patent: Nov. 26, 2019

(54) METHOD OF PRODUCING SUB-STOICHIOMETRIC TITANIUM OXIDE FINE PARTICLES

(71) Applicant: NISSHIN ENGINEERING INC., Tokyo (JP)

(72) Inventors: Akihiro Kinoshita, Fujimino (JP); Shiori Sueyasu, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 0 days.

(21) Appl. No.: 16/068,428

(22) PCT Filed: Dec. 16, 2016

(86) PCT No.: PCT/JP2016/087608
§ 371 (c)(1),
(2) Date: Jul. 6, 2018

(87) PCT Pub. No.: WO2017/119269
PCT Pub. Date: Jul. 13, 2017

(65) Prior Publication Data
US 2019/0016605 A1 Jan. 17, 2019

(30) Foreign Application Priority Data
Jan. 8, 2016 (JP) .................. 2016-002500

(51) Int. Cl.
*C01G 23/04* (2006.01)
*B01J 19/08* (2006.01)

(52) U.S. Cl.
CPC ............ *C01G 23/043* (2013.01); *B01J 19/08* (2013.01); *B01J 19/088* (2013.01);
(Continued)

(58) Field of Classification Search
CPC ....... C01G 23/043; B01J 19/08; B01J 19/088; B01J 2219/089
See application file for complete search history.

(56) References Cited

U.S. PATENT DOCUMENTS

2008/0006954 A1 1/2008 Yubuta et al.
2010/0011992 A1 1/2010 Bujard et al.

FOREIGN PATENT DOCUMENTS

JP 200729859 2/2007
JP 2010515645 5/2010
JP 2014144884 8/2014

*Primary Examiner* — James A Fiorito
(74) *Attorney, Agent, or Firm* — Muncy, Geissler, Olds & Lowe, P.C.

(57) ABSTRACT

The present invention provides a method for producing substoichiometric titanium oxide fine particles, in which the degree of oxidation/reduction of substoichiometric titanium oxide fine particles can be adjusted and which can produce high purity nano-sized substoichiometric titanium oxide fine particles by dispersing substoichiometric titanium oxide (TiOx) fine particles, and especially titanium dioxide ($TiO_2$), in a liquid substance containing a carbon source, adding water so as to form a slurry, forming the slurry into liquid droplets, supplying the liquid droplets to a hot plasma flame that does not contain oxygen, reacting titanium dioxide with carbon in a substance generated by the hot plasma flame so as to produce substoichiometric titanium oxide, and rapidly cooling the produced substoichiometric titanium oxide so as to produce substoichiometric titanium oxide fine particles.

5 Claims, 7 Drawing Sheets

(52) U.S. Cl.
CPC .. *B01J 2219/089* (2013.01); *B01J 2219/0898* (2013.01); *C01P 2002/72* (2013.01); *C01P 2004/62* (2013.01); *C01P 2004/64* (2013.01); *C01P 2006/12* (2013.01); *C01P 2006/40* (2013.01)

METHOD OF PRODUCING SUB-STOICHIOMETRIC TITANIUM OXIDE FINE PARTICLES

TECHNICAL FIELD

The present invention relates to a method of producing substoichiometric titanium oxide (TiOx: 1<x<2) fine particles, particularly to a production method for producing nanosized substoichiometric titanium oxide fine particles using titanium dioxide ($TiO_2$) as a raw material and using thermal plasma.

BACKGROUND ART

At present, fine particles such as oxide fine particles, nitride fine particles and carbide fine particles have been used in the fields of production of sintered bodies for use as electrical insulation materials for semiconductor substrates, printed circuit boards and various electrical insulation parts, materials for high-hardness and high-precision machining tools such as cutting tools, dies and bearings, functional materials for grain boundary capacitors and humidity sensors, and precision sinter molding materials, production of thermal sprayed parts such as engine valves made of materials that are required to be wear-resistant at a high temperature, and production of electrode or electrolyte materials and various catalysts for fuel cells.

Among the foregoing fine particles, a reduced titanium oxide is recently drawing attention. The reduced titanium oxide is different from $TiO_2$ (titanium dioxide), and refers to substoichiometric titanium oxides such as a Mgneli phase of $Ti_nO_{2n-1}$ [where n=4 to ∞] called a phase, a $Ti_3O_5$ phase, a $Ti_2O_3$ phase and a TiO phase.

The reduced titanium oxide is more excellent than $TiO_2$ in not only visible light absorption but also electron conductivity, and accordingly, its applications as an electrode and a conductive filler are highly expected.

The present applicant proposes a production method of substoichiometric oxide particles that is capable of producing nanosized fine particles of high-purity substoichiometric oxide, such as a substoichiometric titanium oxide, by use of thermal plasma in a short time, in Patent Literature 1.

In Patent Literature 1, for example, when substoichiometric titanium oxide fine particles are produced, titanium oxide powder such as titanium dioxide ($TiO_2$), and at least one of titanium metal powder, powder of a titanium compound of an element other than oxygen such as titanium hydride, and substoichiometric titanium oxide powder are supplied into thermal plasma flame separately or as a previously-prepared mixture.

In Patent Literature 1, at least two types of powders, i.e., titanium oxide powder, and at least one of titanium metal powder, titanium compound powder free of oxygen, and substoichiometric titanium oxide powder are used as raw materials. It is described that since no other metallic element than titanium constituting substoichiometric titanium oxide fine particles is used as a metallic element, high-purity substoichiometric titanium oxide fine particles can be obtained.

CITATION LIST

Patent Literature

Patent Literature 1: JP 2014-144884 A

SUMMARY OF INVENTION

Technical Problems

Meanwhile, since the technique disclosed by Patent Literature 1 does not use any metallic element other than titanium as a metallic element, high-purity substoichiometric titanium oxide fine particles can be obtained; however, it is disadvantageous that at least two types of powders, i.e., titanium oxide powder, and titanium metal powder and/or another titanium compound powder need to be prepared as raw materials.

In addition, since the technique disclosed by Patent Literature 1 uses at least two types of titanium-containing powders as described above, the degree of oxidization-reduction of substoichiometric titanium oxide fine particles is determined with the combination of at least two types of powders and cannot be freely adjusted.

Thus, the technique disclosed by Patent Literature 1 has a problem in that substoichiometric titanium oxide fine particles having plural phases, that is, fine particles in a mixed crystal form are generated and therefore it is difficult to obtain a uniform, single-phase substoichiometric titanium oxide fine particles.

An object of the present invention is to solve the above problems inherent in the prior art and to provide a method of producing substoichiometric titanium oxide fine particles that is capable of producing high-purity nanosized substoichiometric titanium oxide fine particles (TiOx) using titanium oxide powder, particularly titanium dioxide ($TiO_2$) powder as a raw material as well as thermal plasma, and of adjusting the degree of oxidation-reduction of substoichiometric titanium oxide fine particles to be produced.

Solution to Problems

In order to attain the above object, the present invention provides a method of producing substoichiometric titanium oxide fine particles by use of titanium dioxide, the method comprising: dispersing powder of the titanium dioxide in a liquid state substance containing a carbon source and then adding water to form a slurry; converting the slurry into droplets and then supplying the slurry into a thermal plasma flame free of oxygen; reacting carbon in the substance as generated in the thermal plasma flame, i.e., carbon generated from the substance with the titanium dioxide to generate substoichiometric titanium oxide; and rapidly cooling the generated substoichiometric titanium oxide to thereby generate substoichiometric titanium oxide fine particles.

Preferably, an amount of the powder of the titanium dioxide ranges from 10 to 65 wt % with respect to a total amount of the powder of the titanium dioxide and the liquid state substance containing the carbon source; an amount of the liquid state substance containing the carbon source ranges from 90 to 35 wt % with respect to the total amount of the powder of the titanium dioxide and the liquid state substance containing the carbon source; and an amount of the water ranges from 5 to 40 wt % with respect to the total amount of the powder of the titanium dioxide and the liquid state substance containing the carbon source.

Preferably, an amount of the added water is adjusted to adjust a degree of oxidation-reduction of substoichiometric titanium oxide fine particles to be produced.

Preferably, the liquid state substance containing the carbon source is alcohol, ketone, kerosene, octane or gasoline.

Preferably, the thermal plasma flame is derived from at least one gas among hydrogen, helium and argon.

Advantageous Effects of Invention

The present invention makes it possible to produce high-purity nanosized substoichiometric titanium oxide fine particles (TiOx) using titanium oxide powder, particularly titanium dioxide ($TiO_2$) powder as a raw material as well as thermal plasma, by utilizing carbon generated from a liquid state substance containing a carbon source as a reducing agent.

According to the present invention, the use of thermal plasma makes it possible to obtain nanosized substoichiometric titanium oxide fine particles without using titanium oxide powder in the form of nanosized particles as a raw material and without requiring several days for production. According to the present invention, high-purity nanosized substoichiometric titanium oxide fine particles with a particle size of less than 200 nm can be obtained.

According to the present invention, nanosized particles are not used as a raw material and therefore, a decrease in productivity can be avoided.

According to the present invention, in production of substoichiometric titanium oxide fine particles, by adjusting the amount of water added at slurrying a liquid state substance containing titanium oxide powder and a carbon source, the degree of oxidation-reduction of substoichiometric titanium oxide fine particles to be produced can be easily adjusted.

DESCRIPTION OF EMBODIMENTS

A method of producing substoichiometric titanium oxide fine particles according to the invention is described in detail below with reference to a preferred embodiment shown in the accompanying drawings.

In the present invention, a substoichiometric titanium oxide generally refers to a titanium oxide that is a substoichiometric compound. The substoichiometric compound is a compound presenting a difference from stoichiometric composition (substoichiometry). Substoichiometric titanium oxide is also called titanium suboxide.

In the present invention, one example of the substoichiometric titanium oxide fine particles is $TiO_x$ ($1<x<2$) particles having fewer oxygen atoms than the stoichiometric composition ($TiO_2$). Titanium dioxide ($TiO_2$) powder is usable as a raw material.

Titanium dioxide ($TiO_2$) has excellent corrosion resistance and has insulation properties. Substoichiometric titanium oxide ($TiO_x$ ($1<x<2$)) has excellent corrosion resistance, has conductivity, and absorbs visible light. In the present invention, fine particles of substoichiometric titanium oxide having different properties from those of titanium dioxide can be obtained.

In the present invention, only titanium dioxide powder is used, and since no other metallic element than titanium constituting the substoichiometric titanium oxide fine particles is used, high-purity substoichiometric titanium oxide fine particles can be obtained.

It is generally known that, in a thermal plasma process using a thermal plasma flame, even when raw powder to be supplied into a thermal plasma flame has a particle size of about 100 µm, nanosized particles with a particle size of less than 200 nm can be obtained. Thus, also in the present invention, even when titanium dioxide powder with a particle size of about 100 µm is used as raw powder, substoichiometric titanium oxide fine particles with a particle size of less than 200 nm can be obtained. While the substoichiometric titanium oxide fine particles of the invention have a particle size of less than 200 nm, the substoichiometric titanium oxide fine particles more preferably have a particle size of 5 to 100 nm.

Thus, in the present invention, even though nanosized titanium dioxide powder is not used as a raw material, nanosized substoichiometric titanium oxide fine particles can be obtained, and therefore the productivity does not decrease due to use of nanosized particles which are difficult to handle.

Titanium dioxide powder used as a raw material preferably has a particle size of 1 to 100 µm. Titanium dioxide powder with a particle size of less than 1 µm is difficult to handle. On the other hand, when titanium dioxide powder has a particle size of more than 100 µm, a portion of the powder that is not evaporated in a thermal plasma process increases.

In the present invention, the particle size is a value obtained by converting a measurement value of the specific surface area.

One characteristic exhibited through nanosizing of substoichiometric titanium oxide fine particles is improvement in permeability of resin, glass or the like in which the particles are dispersed. Other characteristics exhibited through nanosizing is a decrease in thermal conductivity and an increase in specific surface area.

Exemplary applications of substoichiometric titanium oxide fine particles with a particle size of less than 200 nm include their use as heat ray shielding materials, thermoelectric elements, catalysts and support materials.

In the present invention, when a slurry prepared by dispersing titanium dioxide powder in a liquid state substance containing a carbon source and then adding water to the resulting mixture is converted into droplets and supplied into an oxygen-free thermal plasma flame, carbon generated from the liquid state substance through the thermal plasma flame serves as a reducing agent acting on the titanium dioxide powder, and part of the titanium dioxide powder is reduced by the aid of the thermal plasma flame and becomes substoichiometric oxide. Since the thermal plasma flame is free of oxygen, the generated carbon is bonded with oxygen of the titanium dioxide powder, whereby oxygen is taken away from the titanium dioxide that is stoichiometric oxide, so that the titanium dioxide becomes substoichiometric oxide. Thus, substoichiometric titanium oxide fine particles are generated from the titanium dioxide powder.

The titanium dioxide powder used in the invention may contain powder of titanium oxide other than titanium dioxide as long as it comprises titanium dioxide powder as the main component and enables production of substoichiometric titanium oxide fine particles.

While the thermal plasma flame used in the invention is an oxygen-free thermal plasma flame, a thermal plasma flame containing oxygen may be used as long as carbon is surely generated from a carbon source-containing, liquid state substance through the thermal plasma flame in an amount sufficient to reduce titanium dioxide and produce substoichiometric titanium oxide fine particles. Needless to say, a thermal plasma flame totally free of oxygen is preferred. A thermal plasma flame containing oxygen refers to a thermal plasma flame in which an oxygen-containing gas such as an oxygen gas or air is used as part or the whole of plasma gas, while an oxygen-free thermal plasma flame refers to a thermal plasma flame in which an oxygen-containing gas such as an oxygen gas or air is not used as part or the whole of plasma gas.

The method of producing substoichiometric titanium oxide fine particles according to the invention is described below.

Figure 1:
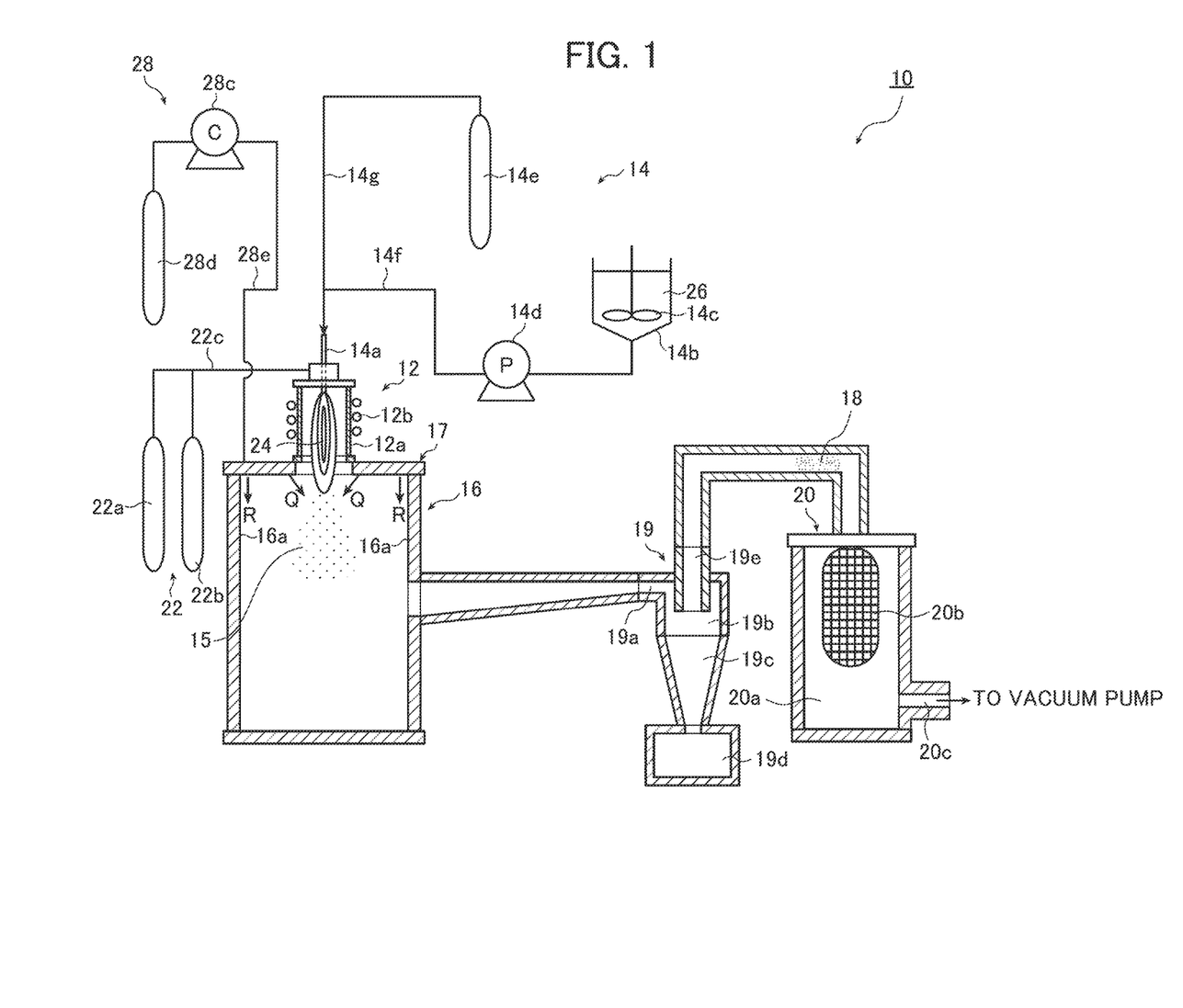
FIG. 1 is a schematic view showing the whole structure of a fine particle producing apparatus for conducting a method of producing substoichiometric titanium oxide fine particles according to an embodiment of the invention.
Figure 2:
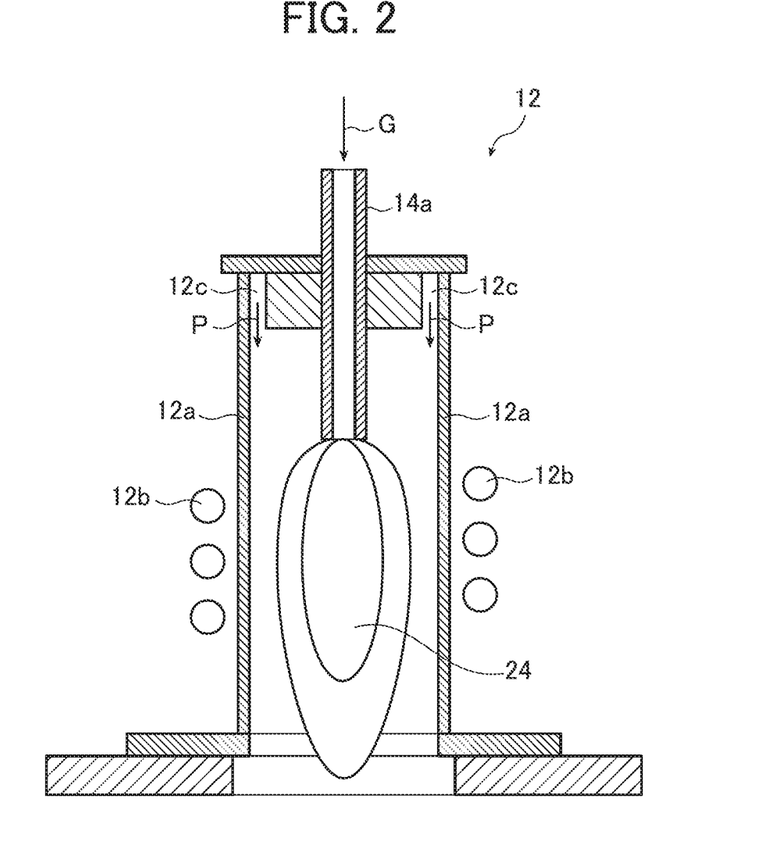
FIG. 2 is an enlarged cross-sectional view of a region including a plasma torch shown in FIG. 1.
Figure 3:
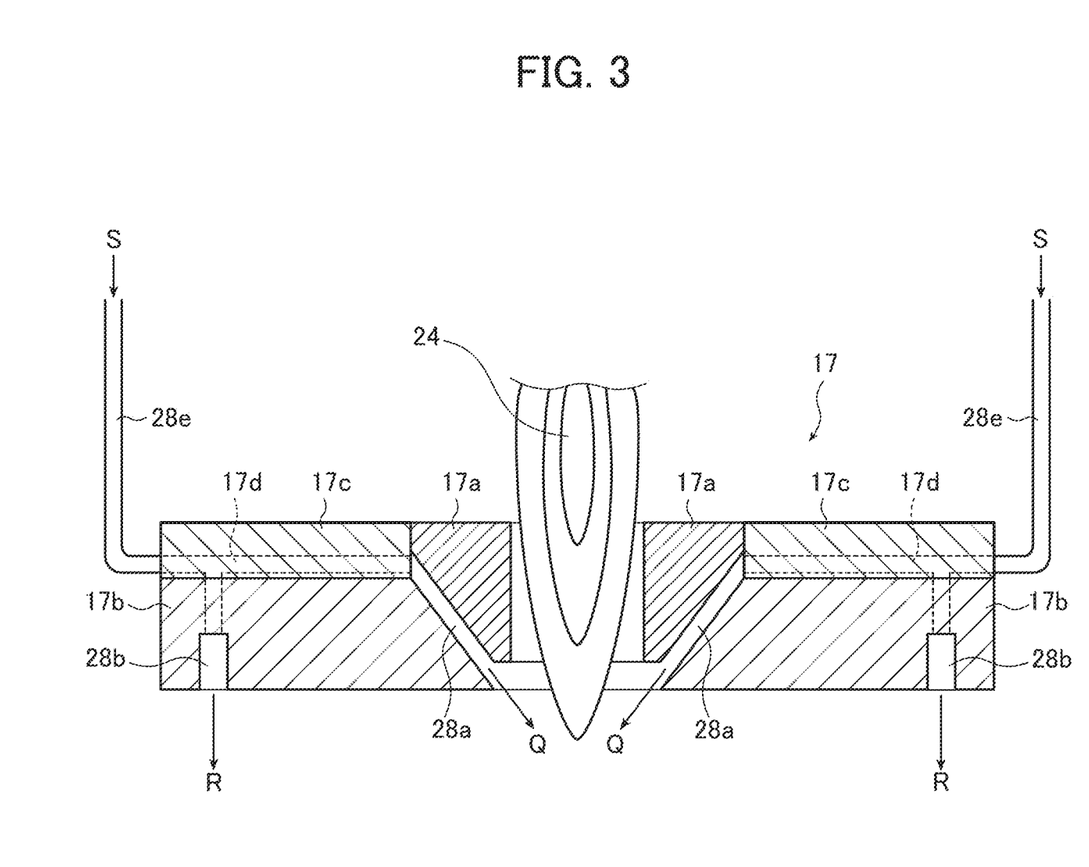
FIG. 3 is an enlarged cross-sectional view of a region including a top plate of a chamber shown in FIG. 1 and gas injecting ports provided in the top plate.
Figure 4:
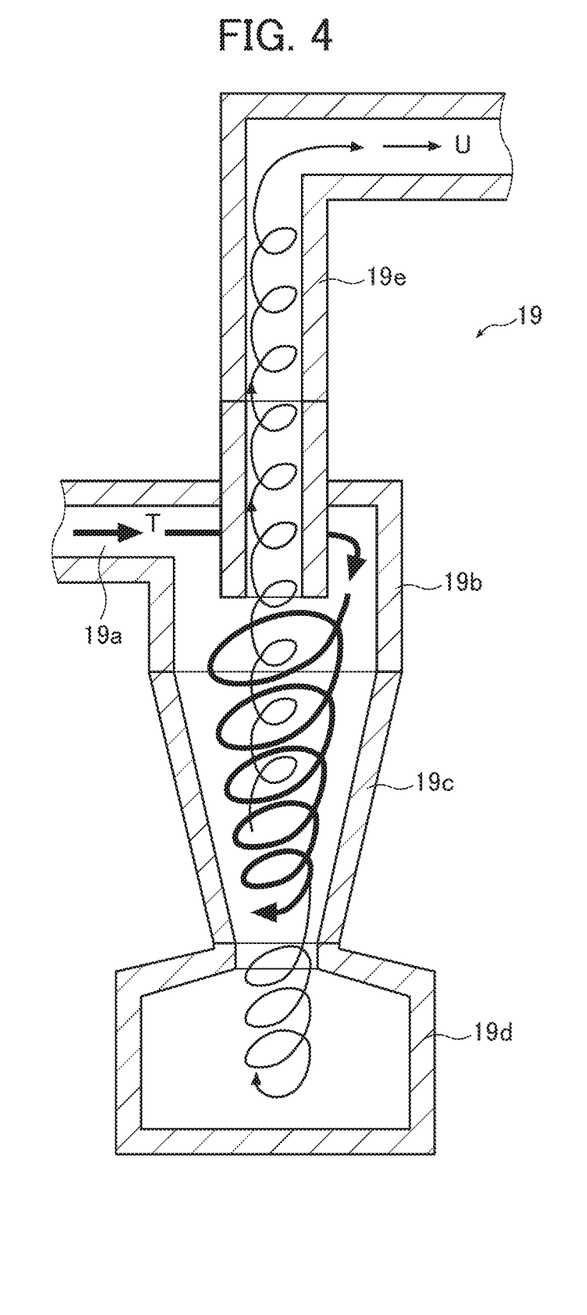
FIG. 4 is an enlarged cross-sectional view of a cyclone shown in FIG. 1.

FIG. 1 is a schematic view showing the whole structure of a fine particle producing apparatus for conducting the method of producing substoichiometric titanium oxide fine particles according to an embodiment of the invention. FIG. 2 is a partially enlarged view of a region including a plasma torch shown in FIG. 1. FIG. 3 is an enlarged cross-sectional view of a region including a top plate of a chamber shown in FIG. 1 and two types of gas injecting ports provided in the top plate. FIG. 4 is an enlarged cross-sectional view of a cyclone.

A fine particle producing apparatus 10 shown in FIG. 1 includes a plasma torch 12 generating thermal plasma, a material supply device 14 slurrying titanium dioxide ($TiO_2$) powder and supplying the resulting slurry into the plasma torch 12, which will be described later, a chamber 16 serving as a cooling tank for generating substoichiometric titanium oxide (TiOx (1<x<2)) fine particles (primary fine particles) 15, a cyclone 19 removing, from the generated primary fine particles 15, coarse particles having a particle size equal to or larger than an arbitrarily specified particle size, and a collecting section 20 collecting substoichiometric titanium oxide (TiOx) fine particles (secondary fine particles) 18 having a desired particle size as obtained through classification in the cyclone 19.

In this embodiment, the fine particle producing apparatus 10 produces nanosized substoichiometric titanium oxide fine particles from a slurry prepared by dispersing titanium dioxide powder (hereinafter also called "titanium dioxide raw material") in a liquid state substance containing a carbon source (hereinafter also called "carbon-containing dispersion medium" or simply "dispersion medium") and then adding water to the resulting mixture.

The plasma torch 12 shown in FIG. 2 includes a quartz tube 12a and a high frequency oscillation coil 12b surrounding the periphery of the quartz tube. A supply tube 14a for a slurry 26 is provided at the center portion of the top of the plasma torch 12, and a plasma gas supply port 12c is formed in the peripheral portion of the center portion (on the same circumference).

Plasma gas is supplied from a plasma gas supply source 22 to the plasma gas supply port 12c (see FIG. 2).

In this embodiment, the use of plasma gas free of oxygen is preferred for the purpose of decomposing the carbon-containing dispersion medium to generate carbon in a thermal plasma flame 24 to be described later without burning the medium. Examples of the plasma gas include hydrogen gas ($H_2$), helium gas (He) and argon gas (Ar). For the plasma gas, the invention is not limited to use of a single gas, and the above gases may be used in combination, as exemplified by the combination of hydrogen and argon, the combination of helium and argon, and the combination of hydrogen, helium and argon.

Two types of plasma gases such as hydrogen and argon are prepared in the plasma gas supply source 22. The plasma gas supply source 22 includes high-pressure gas cylinders 22a and 22b respectively storing, for instance, hydrogen and argon therein, and a gas pipe 22c connecting the high-pressure gas cylinders 22a and 22b to the plasma torch 12.

The plasma gas is sent from the high-pressure gas cylinders 22a and 22b of the plasma gas supply source 22 to the plasma torch 12 through the gas pipe 22c and the plasma gas supply port 12c of ring shape shown in FIG. 2, as indicated by arrows P. Then, a high frequency voltage is applied to the high frequency oscillation coil 12b to generate an oxygen-free thermal plasma flame 24 from, for instance, two types of plasma gases of hydrogen and argon.

When two types of plasma gases of hydrogen and argon are used, the proportion between hydrogen and argon in the plasma gas for the thermal plasma flame 24 is preferably set such that the amount of hydrogen is 0 to 20 vol % relative to the amount of argon.

In this case, the supply amount of the plasma gas is preferably set such that argon is supplied at a rate of 10 to 300 l/min.

When argon, helium and hydrogen are supplied as the plasma gas from the plasma gas supply source 22 in order to generate the thermal plasma flame 24 in the plasma torch 12, the proportion of hydrogen, helium and argon in the plasma gas for the thermal plasma flame 24 is preferably set such that the amount of hydrogen is 0 to 20 vol % relative to the total amount of helium and argon.

In this case, the supply amount of the plasma gas is preferably set such that argon is supplied at a rate of 10 to 300 l/min and helium is supplied at a rate of 5 to 30 l/min.

In the present invention, two types of gases of helium and hydrogen may be used as the plasma gas, and in this case, the amount of hydrogen is preferably 0 to 20 vol % relative to the total amount of helium.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

As shown in FIG. 1, the material supply device 14 is connected to the top of the plasma torch 12 so as to supply the slurry 26, which is prepared by mixing the titanium dioxide raw material with the carbon-containing dispersion medium and adding water to the mixture, from the material supply device 14 to the plasma torch 12 at a constant rate.

In the present invention, since the slurry 26 prepared by mixing the titanium dioxide raw material with the carbon-containing dispersion medium and adding water to the mixture is used, compared to the case of using a slurry made from the titanium dioxide raw material and the carbon-containing dispersion medium, the degree of oxidation-reduction of substoichiometric titanium oxide fine particles to be produced can be varied, and the sheet resistance of produced substoichiometric titanium oxide fine particles can be decreased.

In addition, in the present invention, by adjusting the amount of water in preparation of the slurry 26, the degree of oxidation-reduction of substoichiometric titanium oxide fine particles to be produced can be adjusted using the amount of the water added, and thus the sheet resistance of produced substoichiometric titanium oxide fine particles can be varied.

The material supply device 14 includes the supply tube 14a that converts the slurry 26 into droplets and supplies it into the plasma torch 12, a container 14b that contains the slurry 26, a stirrer 14c that stirs the slurry 26 in the container 14b, a pump 14d that applies a high pressure to the slurry 26 through the supply tube 14a to supply the slurry into the plasma torch 12, an atomizing gas supply source (high-pressure gas cylinder) 14e that supplies atomizing gas used for spraying the slurry 26 into the plasma torch 12, a slurry pipe 14f that connects the container 14b to the supply tube 14a via the pump 14d, and a gas pipe 14g that connects the atomizing gas supply source (high-pressure gas cylinder) 14e to the slurry pipe 14f at a position near the supply tube 14a.

The slurry 26 in the container 14b is produced in the following manner.

For instance, a predetermined amount of titanium dioxide raw material is supplied from an unshown raw material tank or the like to the container 14b, and a predetermined amount of carbon-containing dispersion medium is gradually added from an unshown tank or the like and mixed under stirring by means of the stirrer 14c so as to slurry the titanium dioxide raw material and the carbon-containing dispersion medium, whereafter a predetermined amount of water (e.g., tap water, standing water in an unshown tank) is added little by little to the slurry composed of the titanium dioxide raw material and the carbon-containing dispersion medium, thereby producing the slurry 26 in a desired condition.

Alternatively, a predetermined amount of carbon-containing dispersion medium is supplied from an unshown tank or the like to the container 14b, and a predetermined amount of titanium dioxide raw material is gradually added from an unshown raw material tank or the like and mixed under stirring by means of the stirrer 14c so as to slurry the titanium dioxide raw material and the carbon-containing dispersion medium, whereafter a predetermined amount of water (e.g., tap water, standing water in an unshown tank) is added little by little to the slurry composed of the titanium dioxide raw material and the carbon-containing dispersion medium, thereby producing the slurry 26 in a desired condition.

In the material supply device 14, high-pressure atomizing gas to which a push-out pressure is applied is sent from the atomizing gas supply source 14e and, together with the slurry 26, supplied into the thermal plasma flame 24 in the plasma torch 12 through the supply tube 14a, as indicated by arrow G in FIG. 2. The supply tube 14a has a two-fluid nozzle mechanism for spraying the slurry 26 into the thermal plasma flame 24 in the plasma torch 12 while converting the slurry into droplets, whereby the slurry 26 can be sprayed into the thermal plasma flame 24 in the plasma torch 12, in other words, the slurry 26 can be converted into droplets. For the atomizing gas, argon, helium, hydrogen and the like are used alone or in combination.

Thus, the two-fluid nozzle mechanism is capable of applying a high pressure to the slurry 26 to spray the slurry 26 while converting the slurry into droplets with the atomizing gas which is a gaseous matter, and is therefore used as one method for converting the slurry 26 into droplets. For example, using a nozzle with an inside diameter of 1 mm in the two-fluid nozzle mechanism, when the slurry 26 is flowed at 20 ml/min with a supply pressure of 0.2 to 0.3 MPa and the atomizing gas is sprayed at 10 to 20 l/min, droplets of the slurry 26 with a size of about 5 to about 10 μm can be obtained.

While the two-fluid nozzle mechanism is used in this embodiment, a single-fluid nozzle mechanism may be used. Supply of the atomizing gas is not indispensable as long as the slurry 26 can be converted into droplets in the supply tube 14a.

Other exemplary methods include a method which involves causing a slurry to fall at a constant speed onto a rotating disk so as to convert the slurry into droplets by the centrifugal force, and a method which involves applying a high voltage to the surface of a slurry to convert the slurry into droplets.

As shown in FIG. 1, the chamber 16 is provided below and adjacent to the plasma torch 12. Due to the presence of carbon generated through decomposition of a portion of the dispersion medium that is contained in the slurry 26 sprayed into the thermal plasma flame 24 in the plasma torch 12 and that has not been burned by the thermal plasma flame 24, the titanium dioxide raw material is partially reduced and becomes substoichiometric titanium oxide; immediately after that, the substoichiometric titanium oxide is rapidly cooled in the chamber 16, whereby the primary fine particles (substoichiometric titanium oxide fine particles) 15 are generated. Thus, the chamber 16 serves as a cooling tank.

The fine particle producing apparatus 10 in this embodiment further includes a gas supply device 28 for rapidly cooling the generated substoichiometric titanium oxide fine particles 15 in order to conduct one of methods for producing the substoichiometric titanium oxide fine particles 15 more efficiently. The gas supply device 28 is described below.

The gas supply device 28 shown in FIGS. 1 and 3 includes a gas injecting port 28a used to inject gas at a predetermined angle toward the tail portion of the thermal plasma flame 24 (the end of the thermal plasma flame 24 on the opposite side from the plasma gas supply port 12c, i.e., the terminating portion of the thermal plasma flame 24), a gas injecting port 28b used to inject gas downward along an inner wall (inside wall) 16a of the chamber 16, a compressor 28c that applies a push-out pressure (e.g., high pressure) to gas to be supplied into the chamber 16, a supply source (high-pressure gas cylinder) 28d of the gas to be supplied into the chamber 16, and a gas pipe 28e that connects these components. The compressor 28c may be a blower.

In addition to the effect of rapidly cooling the primary fine particles 15 generated in the chamber 16, the gas injected from the gas injecting port 28a has additional effects including contribution to classification of the primary fine particles 15 in the cyclone 19 in cooperation with the gas injected from the gas injecting port 28b, as will be described later in detail.

The compressor 28c and the gas supply source 28d are connected to a top plate 17 of the chamber 16 via the gas pipe 28e.

As shown in FIG. 3, the gas injecting ports 28a and 28b are formed in the top plate 17 of the chamber 16.

The top plate 17 is a plate member covering the ceiling portion of the chamber 16, and includes: an inner top plate part 17a that has the shape of a circular truncated cone with its upper part partially taking on a cylindrical shape and has at its center a through-hole surrounding the thermal plasma flame 24; an outer top plate part 17b that has at its center a through-hole in the shape of a circular truncated cone; and an upper and outer top plate part 17c of annular shape that has a through-hole accommodating the inner top plate part 17a and has a movement mechanism causing the inner top plate part 17a to vertically move along this through-hole.

A gas passage 17d that communicates with the gas pipe 28e and allows air sent from the gas pipe 28e to pass therethrough is provided in the outer top plate part 17b and the upper and outer top plate part 17c of the top plate 17. The gas passage 17d communicates with the gas injecting port 28a that is formed to extend at a predetermined angle between the inner top plate part 17a and the outer top plate part 17b in the central portion of the top plate 17 of the chamber 16 and that is used to inject gas at a predetermined angle toward the tail portion of the thermal plasma flame 24 in the plasma torch 12, and communicates with the gas injecting port 28b that is formed to extend vertically downward at the edge portion of the top plate 17, i.e., the edge portion of the outer top plate part 17b and that is used to inject gas along the inner wall 16a of the chamber 16.

The portion where the inner top plate part 17a and the upper and outer top plate part 17c are in contact (in the inner top plate part 17a, the upper portion in the cylindrical shape) is threaded, so that when rotated, the inner top plate part 17a can change its position in the vertical direction and accordingly, the distance between the inner top plate part 17a and the outer top plate part 17b can be adjusted. The gradient of the circular truncated cone portion of the inner top plate part 17a and the gradient of the circular truncated cone portion of the through-hole of the outer top plate part 17b are the same, and the surfaces of those circular truncated cone portions face each other.

Thus, the gas injecting port 28a is a gap formed between the inner top plate part 17a and the outer top plate part 17b, that is, a slit formed to have a circular shape concentric with the top plate 17 with the slit width being adjustable. The gas injecting port 28a may have any shape as long as it can be used to inject gas toward the tail portion of the thermal plasma flame 24, and the shape thereof is not limited to the slit shape as above and may be a shape having a number of holes along a circle.

Gas sent through the gas pipe 28e passes the gas passage 17d provided inside the upper and outer top plate part 17c to be sent to the gas injecting port 28a that is a slit formed between the inner top plate part 17a and the outer top plate part 17b as described above. The gas sent to the gas injecting port 28a is injected in the direction indicated by arrows Q in FIGS. 1 and 3 toward the tail portion (terminating portion) of the thermal plasma flame in a predetermined supply amount and at a predetermined angle as described above.

The gas injecting port 28b of the gas supply device 28 is a slit formed in the outer top plate part 17b of the top plate 17, is used to inject gas, which is sent through the gas pipe 28e and then the gas passage 17d provided in the upper and outer top plate part 17c and the outer top plate part 17b, into the chamber 16, and is preferably configured to inject gas in an amount that allows the primary fine particles 15 to flow at a flow rate enabling classification of the primary fine particles 15 at a given classification point in the cyclone 19 downstream while preventing the generated primary fine particles 15 from adhering to the inner wall 16a of the chamber 16. From this gas injecting port 28b, gas is injected downward along the inner wall 16a of the chamber 16.

As described above, as shown in FIGS. 1 and 3, gas sent from the gas supply source 28d of the gas supply device 28 and supplied into the top plate 17 via the gas pipe 28e as indicated by arrows S is injected into the chamber 16 from the gas injecting ports 28a and 28b through the gas passage 17d provided in the outer top plate part 17b and the upper and outer top plate part 17c of the top plate 17.

Thus, the slurry 26 sent from the material supply device 14, injected into the plasma torch 12 and converted into droplets is not burned in the thermal plasma flame 24, and the titanium dioxide raw material therein is partially reduced to become substoichiometric titanium oxide, which will be described later. The substoichiometric titanium oxide is rapidly cooled by gas injected from the gas injecting port 28a (see arrows Q) in the chamber 16, and thus the primary fine particles 15 made of the substoichiometric titanium oxide are generated. In this process, the primary fine particles 15 are prevented from adhering to the inner wall of the chamber 16 owing to gas injected from the gas injecting port 28b (see arrows R).

As shown in FIG. 1, the cyclone 19 for classifying the generated primary fine particles 15 based on a desired particle size is provided at a lower position on a lateral side of the chamber 16. As shown in FIG. 4, the cyclone 19 includes an inlet tube 19a supplying the primary fine particles 15 from the chamber 16, a cylindrical outer casing 19b connected to the inlet tube 19a and positioned at an upper portion of the cyclone 19, a truncated cone portion 19c continuing downward from a lower portion of the outer casing 19b and having a gradually decreasing diameter, a coarse particle collecting chamber 19d connected to a lower side of the truncated cone portion 19c and collecting coarse particles having a particle size equal to or larger than the above-mentioned desired particle size, and an inner tube 19e connected to the collecting section 20 to be described later in detail and projecting from the outer casing 19b.

A gas stream containing the primary fine particles 15 generated in the chamber 16 is, through the inlet tube 19a, blown in along the inner peripheral wall of the outer casing 19b, and accordingly, this gas stream flows in the direction from the inner peripheral wall of the outer casing 19b to the truncated cone portion 19c as indicated by arrow T in FIG. 4, thereby forming a swirling downward stream.

The swirling downward stream is accelerated on the inner peripheral wall of the truncated cone portion 19c and then turns in the opposite direction, so that the upward stream is discharged out of the system through the inner tube 19e. Part of the gas stream turns in the opposite direction in the truncated cone portion 19c before entering the coarse particle collecting chamber 19d and is discharged out of the system through the inner tube 19e. A centrifugal force is exerted on the particles because of the swirling stream, and coarse particles move toward the wall due to the balance between the centrifugal force and drag. The substoichiometric titanium oxide fine particles separated from the gas stream go down along the lateral surface of the truncated cone portion 19c and are collected in the coarse particle collecting chamber 19d. Fine particles receiving only an insufficient centrifugal force are discharged out of the system together with the gas stream reversed on the inner peripheral wall of the truncated cone portion 19*c*.

The apparatus is configured such that a negative pressure (suction force) is exerted from the collecting section 20 to be described later in detail through the inner tube 19*e*. Owing to the negative pressure (suction force), the substoichiometric titanium oxide fine particles separated from the above-described swirling gas stream are attracted as indicated by arrow U in FIG. 4 and sent to the collecting section 20 through the inner tube 19*e*.

As shown in FIG. 1, on the extension of the inner tube 19*e* that is an outlet of the gas stream in the cyclone 19, there is provided the collecting section 20 for collecting the secondary fine particles (substoichiometric titanium oxide fine particles) 18 having a desired particle size of nanosize. The collecting section 20 includes a collecting chamber 20*a*, a filter 20*b* provided in the collecting chamber 20*a*, and a vacuum pump (not shown) connected through a pipe 20*c* provided at a lower portion of the inside of the collecting chamber 20*a*. The fine particles sent from the cyclone 19 are sucked by the vacuum pump (not shown) to be drawn into the collecting chamber 20*a* and remain on the surface of the filter 20*b* to be collected.

Figure 5:
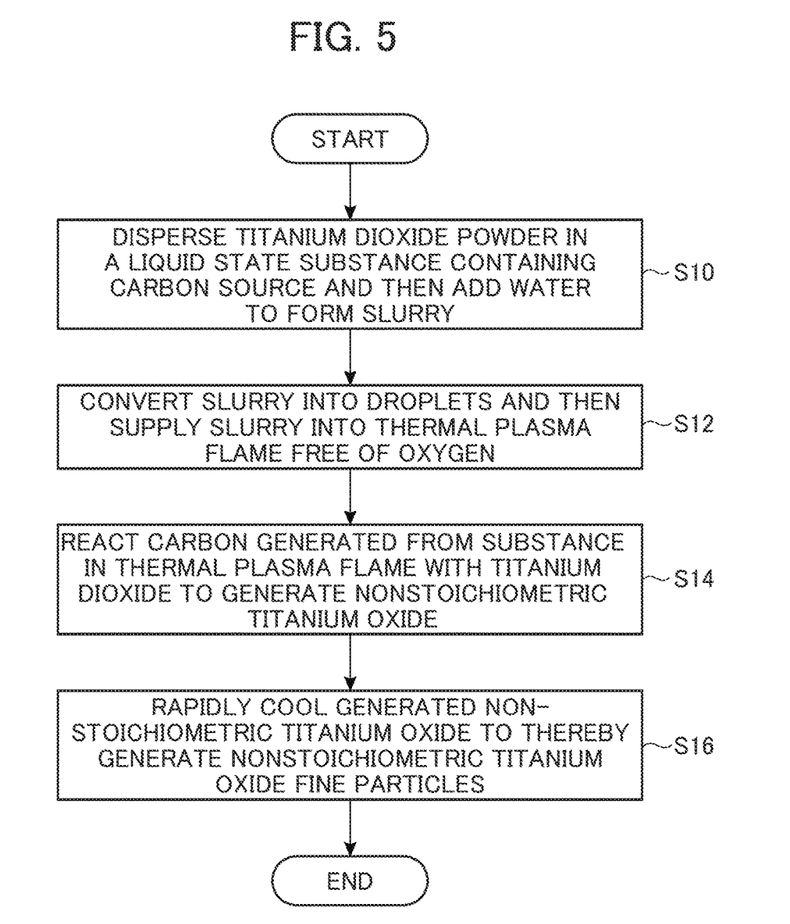
FIG. 5 is a flowchart showing the method of producing substoichiometric titanium oxide fine particles according to the embodiment of the invention.

With reference to FIG. 5, the method of producing substoichiometric titanium oxide fine particles according to the embodiment of the invention is described below using the fine particle producing apparatus 10 while the operation of the fine particle producing apparatus 10 configured as above is described.

FIG. 5 is a flowchart showing the method of producing substoichiometric titanium oxide fine particles according to the embodiment of the invention.

In this embodiment, the titanium dioxide raw material (titanium dioxide powder) is used as a raw material of substoichiometric titanium oxide fine particles, and has an average particle size of not more than 50 µm and preferably not more than 10 µm in order to facilitate its evaporation in the thermal plasma flame.

In this embodiment, examples of the carbon-containing dispersion medium include alcohols, ketones, kerosenes, octanes and gasolines.

Examples of alcohols include ethanol, methanol, propanol and isopropyl alcohol.

As described above, the carbon-containing dispersion medium is used for reducing the titanium dioxide raw material. Therefore, it is preferable that the carbon-containing dispersion medium be easily decomposed by the thermal plasma flame 24. For this reason, lower alcohols are preferably used for the carbon-containing dispersion medium.

Further, water ($H_2O$) is added to the slurry 26. This water serves to accelerate conversion of the titanium dioxide raw material into substoichiometric titanium oxide by the aid of the carbon-containing dispersion medium.

In the method of producing substoichiometric titanium oxide fine particles according to the embodiment shown in FIG. 5, first, in Step S10, the titanium dioxide raw material is dispersed in the carbon-containing dispersion medium, and water is added to the mixture, thereby obtaining a slurry. The slurry is not limited in the mixing ratio between the titanium dioxide raw material and the dispersion medium as well as in the amount of water, and the mixing ratio and the amount of water may assume any values as long as substoichiometric titanium oxide can be generated from the titanium dioxide raw material.

The amount of the titanium dioxide raw material preferably ranges from 10 to 65 wt % with respect to the total amount of the titanium dioxide raw material and the dispersion medium, the amount of the dispersion medium preferably ranges from 90 to 35 wt % with respect to the total amount of the titanium dioxide raw material and the dispersion medium, and the amount of water preferably ranges from 5 to 40 wt % with respect to the total amount of the titanium dioxide raw material and the dispersion medium.

In the present invention, the mixing ratio between the titanium dioxide raw material and the dispersion medium is preferably 50:50 in weight ratio, for example. In the present invention, since various crystal phases (TiOx (1<x<2), e.g., $Ti_2O_3$, $Ti_3O_5$, $Ti_4O_7$ and the like) are controlled by changing the amount of added water appropriate for production of the slurry, the amount of added water is preferably set for each crystal phase in advance through experiments or the like.

The dispersion medium and water are used for reducing titanium dioxide, and therefore the weight ratio between the titanium dioxide raw material and the dispersion medium and the amount of added water are suitably changed in preparation of the slurry in order to generate substoichiometric titanium oxide.

In preparation of the slurry 26, one or a mixture of two or more selected from the group consisting of surfactants, polymers and coupling agents may be added. Examples of surfactants for use include sorbitan fatty acid ester that is a nonionic surfactant. Examples of polymers for use include ammonium polyacrylate. Examples of coupling agents for use include a silane coupling agent. By adding one or a mixture of two or more selected from the group consisting of surfactants, polymers and coupling agents to the slurry 26, the titanium dioxide raw material is effectively prevented from aggregating in the dispersion medium or water, and thus the slurry 26 can be stabilized.

The slurry prepared as above is introduced into the container 14*b* of the material supply device 14 shown in FIG. 1 and stirred by the stirrer 14*c*. Owing to this, the titanium dioxide raw material in the dispersion medium is prevented from precipitating, and the slurry 26 is maintained with the titanium dioxide raw material being dispersed in the dispersion medium therein. The slurry 26 may be continuously prepared by supplying the titanium dioxide raw material, the dispersion medium and water to the material supply device 14.

Next, in Step S12, the slurry 26 is converted into droplets and supplied into the oxygen-free thermal plasma flame 24.

The slurry 26 is converted into droplets using the two-fluid nozzle mechanism of the supply tube 14*a* of the material supply device 14, and the slurry 26 in the form of droplets is supplied into the plasma torch 12 and consequently supplied into the thermal plasma flame 24 generated in the plasma torch 12, so that carbon is generated without burning the dispersion medium.

The oxygen-free thermal plasma flame 24 evaporates the slurry 26 in the form of droplets and thus decomposes and evaporates the slurry without burning the dispersion medium, thereby generating carbon. At this time, water is also decomposed into hydrogen and oxygen. Further, the thermal plasma flame 24 reduces the titanium dioxide raw material using its temperature and the generated carbon and also controls the reduction using oxygen generated from water, thereby forming substoichiometric titanium oxide. For this purpose, the temperature of the thermal plasma flame 24 needs to be higher than the temperature at which the titanium dioxide raw material contained in the slurry is reduced by the presence of carbon.

Meanwhile, the higher the temperature of the thermal plasma flame 24 is, the more easily the titanium dioxide raw material is reduced, and therefore a higher temperature is favorable; however, the temperature is not particularly limited and may be suitably set according to the temperature at which the titanium dioxide raw material is reduced. For instance, the thermal plasma flame 24 may have a temperature of 2,000° C., and in theory, the temperature is deemed to reach 10,000° C. or thereabout. In the present invention, the thermal plasma flame 24 preferably has a temperature of, for instance, 4,000 to 10,000° C.

The ambient pressure inside the plasma torch 12 where the thermal plasma flame 24 is generated is preferably equal to or lower than the atmospheric pressure. The atmosphere of equal to or lower than the atmospheric pressure is not particularly limited and may range from 5 Torr to 750 Torr, for example.

Thus, the slurry 26 is evaporated in the oxygen-free thermal plasma flame 24, and also the dispersion medium such as methanol is decomposed without being burned whereby carbon is obtained. The amount of the dispersion medium in the slurry 26 is preferably adjusted such that this carbon is generated in a larger amount compared to the titanium dioxide raw material.

Next, in Step S14, carbon thus generated in the thermal plasma flame 24 and the titanium dioxide are reacted with each other to generate substoichiometric titanium oxide.

Carbon generated in the thermal plasma flame 24 reacts with the titanium dioxide raw material, the titanium dioxide is reduced into substoichiometric titanium oxide, and the reduction is controlled by use of oxygen generated from water to thereby form a substoichiometric titanium oxide.

Next, in Step S16, the substoichiometric titanium oxide thus generated in Step S14 is rapidly cooled to generate substoichiometric titanium oxide fine particles (primary fine particles) 15.

The substoichiometric titanium oxide generated in Step S14 is rapidly cooled by gas injected from the gas injecting port 28a in the direction indicated by arrows Q and thus rapidly cooled in the chamber 16, whereby the primary fine particles 15 made of the substoichiometric titanium oxide are obtained.

Therefore, in the process of generating the primary fine particles 15, the gas injected from the gas injecting port 28a needs to be supplied in an amount sufficient to rapidly cool the substoichiometric titanium oxide fine particles 15 and, in addition, is preferably supplied in an amount that makes it possible to provide the flow rate enabling classification of the primary fine particles 15 at a given classification point in the cyclone 19 downstream with stability of the thermal plasma flame 24 being not hindered when combined with the amount of gas injected from the gas injecting port 28b and the amount of gas supplied into the thermal plasma flame 24, which will be described later.

The injection amount that is the sum of the amount of the gas injected from the gas injecting port 28a and the amount of the gas injected from the gas injecting port 28b is preferably 200% to 5,000% of the gas supplied into the thermal plasma flame 24. The gas supplied into the thermal plasma flame mentioned above refers to the sum of plasma gas forming the thermal plasma flame, central gas for forming a plasma flow, and atomizing gas.

The supply methods, supply positions and the like of the injected gases above are not particularly limited as long as stability of the thermal plasma flame 24 is not hindered. In the fine particle producing apparatus 10 in the embodiment, a circular slit is formed in the top plate 17 to inject gas but any other method or position may be adopted as long as the method or position employed enables gas to be reliably supplied somewhere on the path from the thermal plasma flame to the cyclone.

Finally, the primary fine particles 15 made of the substoichiometric titanium oxide as generated in the chamber 16 are, together with a gas stream, blown in from the inlet tube 19a of the cyclone 19 to go along the inner peripheral wall of the outer casing 19b, and accordingly this gas stream flows along the inner peripheral wall of the outer casing 19b as indicated by arrow T in FIG. 4 and forms a swirling stream, which goes downward. The swirling stream is further accelerated on the inner peripheral wall of the truncated cone portion 19c and then turns in the opposite direction, so that the upward stream is discharged out of the system through the inner tube 19e. Part of the gas stream turns in the opposite direction on the inner peripheral wall of the truncated cone portion 19c before entering the coarse particle collecting chamber 19d and is discharged out of the system through the inner tube 19e.

A centrifugal force is exerted on the primary fine particles 15 made of the substoichiometric titanium oxide because of the swirling stream, and coarse particles of the primary fine particles 15 move toward the wall due to the balance between the centrifugal force and drag. Of the primary fine particles 15, the particles separated from the gas stream go down along the lateral surface of the truncated cone portion 19c and are collected in the coarse particle collecting chamber 19d. Fine particles receiving only an insufficient centrifugal force are, as substoichiometric titanium oxide fine particles (secondary fine particles) 18, discharged out of the system through the inner tube 19e together with the gas stream reversed on the inner peripheral wall of the truncated cone portion 19c. At this time, the gas stream heading to the cyclone 19 preferably flows at a flow rate of more than 10 m/sec.

Owing to a negative pressure (suction force) from the collecting section 20, the discharged substoichiometric titanium oxide fine particles (secondary fine particles) 18 are sucked in the direction indicated by arrow U in FIG. 4 and sent to the collecting section 20 through the inner tube 19e to be collected on the filter 20b of the collecting section 20. The internal pressure of the cyclone 19 at this time is preferably equal to or lower than the atmospheric pressure. For the particle size of the substoichiometric titanium oxide fine particles (secondary fine particles) 18, an arbitrary particle size at the nanosize level is set according to the intended purpose.

Thus, nanosized substoichiometric titanium oxide fine particles can be obtained in this embodiment.

It should be noted that the number of cyclones used in the method of producing substoichiometric titanium oxide fine particles according to the invention is not limited to one and may be two or more.

The substoichiometric titanium oxide fine particles produced by the method of producing substoichiometric titanium oxide fine particles according to the embodiment preferably have a narrow particle size distribution, in other words, have a uniform particle size, and coarse particles with a particle size of 1 μm or more are hardly included; more specifically, the substoichiometric titanium oxide fine particles are preferably nanosized particles having a specific surface area of 10 to 100 $m^2/g$.

In this embodiment, since the carbon source used for reduction of the titanium dioxide raw material is a fluid (carbon-containing dispersion medium) and the other substance is water, it is possible to easily and uniformly supply the titanium dioxide raw material to the thermal plasma flame. Further, the carbon source is a fluid and is therefore more easily decomposed compared to a solid-state carbon source such as graphite, thus making it possible to efficiently react the titanium dioxide raw material with carbon. Accordingly, the reaction efficiency of the titanium dioxide raw material to substoichiometric titanium oxide increases, and substoichiometric titanium oxide fine particles can be produced with high productivity.

The method of producing substoichiometric titanium oxide fine particles according to the embodiment makes it possible to classify substoichiometric titanium oxide fine particles in the cyclone provided in the apparatus by supplying gas and arbitrarily controlling the flow rate in the apparatus. Since the method of producing substoichiometric titanium oxide fine particles according to the embodiment can separate coarse particles at a given classification point by changing the flow rate of a gas stream or the inside diameter of the cyclone without changing reaction conditions, it is possible to produce high-quality, high-purity substoichiometric titanium oxide fine particles having a fine and uniform particle size with high productivity.

In the method of producing substoichiometric titanium oxide fine particles according to the embodiment, since the retention time is prolonged owing to the swirling stream in the cyclone, substoichiometric titanium oxide fine particles can be cooled in the cyclone, and thus a fin or a cooling path, which has been conventionally used as a cooling mechanism, is not necessary. Therefore, it is not necessary to stop the operation of the apparatus for removing fine particles deposited on such a fin, and thus the apparatus can be operated for a longer time. Moreover, when the cyclone is configured to have a water-cooling jacket structure as a whole, a cooling effect can be further increased.

As described above, the fine particle producing apparatus 10 for conducting the method of producing substoichiometric titanium oxide fine particles according to the embodiment is characterized in that it has the gas supply device 28 that is provided mainly for the purpose of rapidly cooling a substoichiometric titanium oxide-containing mixture in a gas phase state.

In the gas supply device 28 in the illustrated example, gas sent from the gas supply source 28*d* to the gas injecting port 28*a* through the gas pipe 28*e* and the gas passage 17*d* in the top plate 17 is injected in the direction indicated by arrows Q in FIGS. 1 and 3 toward the tail portion (terminating portion) of the thermal plasma flame in the predetermined supply amount and at the predetermined angle as described above, in order to rapidly cool a substoichiometric titanium oxide-containing mixture in a gas phase state in the thermal plasma flame 24.

Now, the predetermined supply amount is described. The supply amount of gas for rapidly cooling a substoichiometric titanium oxide-containing mixture (hereinafter simply called "mixture") in a gas phase state described above is set such that the average flow rate of gas, which is supplied into the chamber 16 forming a space necessary for rapidly cooling the mixture in a gas phase state, in the chamber 16 (flow rate in the chamber) is preferably 0.001 to 60 m/sec and more preferably 0.5 to 10 m/sec. This is a sufficient supply amount of gas for rapidly cooling the mixture in a gas phase state, which is generated as a result of spraying into the thermal plasma flame 24 and consequent evaporation, to generate fine particles and for preventing the generated fine particles from aggregating through their collision.

The supply amount needs to be an amount sufficient for rapidly cooling and solidifying the mixture in a gas phase state and also for diluting the mixture in a gas phase state so as to prevent substoichiometric titanium oxide fine particles having just been solidified and generated from aggregating through their collision, and thus should be appropriately determined depending on the shape and size of the chamber 16.

The supply amount is, however, preferably controlled so as not to hinder stability of the thermal plasma flame.

Figure 6:
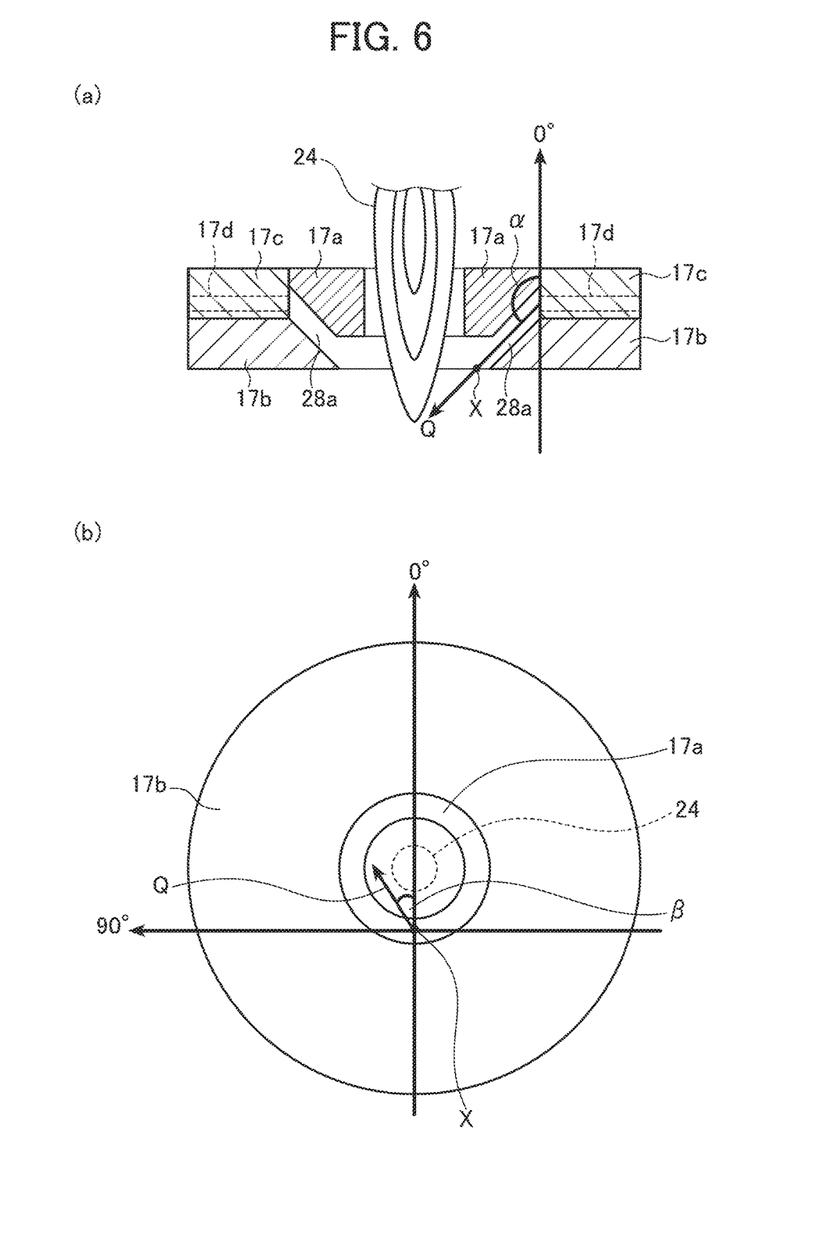
FIG. 6 includes explanatory views each showing an angle of injection of gas, where (a) is a cross-sectional view taken along a vertical direction extending through the central axis of the top plate of the chamber, and (b) is a bottom view of the top plate as viewed from the bottom.

Next, with reference to FIGS. 6(*a*) and (*b*), the predetermined angle when the gas injecting port 28*a* takes on the slit shape is described. FIG. 6(*a*) shows a cross-sectional view taken along a vertical direction extending through the central axis of the top plate 17 of the chamber 16, and FIG. 6(*b*) is a view of the top plate 17 as seen from the bottom. FIG. 6(*b*) shows the direction perpendicular to the cross section shown in FIG. 6(*a*). A point X shown in FIGS. 6(*a*) and (*b*) is an injection point at which gas sent from the gas supply source 28*d* (see FIG. 1) through the gas passage 17*d* is injected from the gas injecting port 28*a* into the chamber 16. Actually, since the gas injecting port 28*a* is a circular slit, gas being injected forms a band-like gas flow. Thus, the point X is an imaginary injection point.

As shown in FIG. 6(*a*), taking the center of an opening of the gas passage 17*d* in the vertical direction in the drawing as the origin, the vertically upward direction is defined as 0°, the counterclockwise direction on the paper sheet is defined as positive, and the angle of gas injected from the gas injecting port 28*a* in the direction indicated by arrow Q is represented by an angle α. The angle α is an angle with respect to the direction from the starting portion to the tail portion (terminating portion) of the thermal plasma flame 24 described above.

As shown in FIG. 6(*b*), taking the imaginary injection point X as the origin, the direction toward the center of the thermal plasma flame 24 is defined as 0°, the counterclockwise direction on the paper sheet is defined as positive, and the angle of gas injected from the gas injecting port 28*a* in the direction indicated by arrow Q in a plane perpendicular to the direction from the starting portion to the tail portion (terminating portion) of the thermal plasma flame 24 is represented by an angle β. The angle β is an angle with respect to the central portion of the thermal plasma flame 24 in a plane perpendicular to the direction from the starting portion to the tail portion (terminating portion) of the thermal plasma flame 24 described above.

When the angle α (normally an angle in the vertical direction) and the angle β (normally an angle in the horizontal direction) as above are used, the foregoing predetermined angle, i.e., a direction of gas supplied into the chamber 16 is preferably set such that the angle α is $90°<\alpha<240°$ (more preferably $100°<\alpha<180°$, most preferably $\alpha=135°$) and the angle β is $-90°<\beta<90°$ (more preferably $-45°<\beta<45°$, most preferably $\beta=0°$) in relation to the tail portion (terminating portion) of the thermal plasma flame 24 in the chamber 16.

As described above, the mixture in a gas phase state is rapidly cooled by gas injected toward the thermal plasma flame 24 in the predetermined supply amount and at the predetermined angle, whereby the fine particles 15 are generated. While the gas injected into the chamber 16 at the predetermined angle does not always reach the tail portion of the thermal plasma flame 24 at the exact angle of injection due to the influence of turbulence that may occur in the chamber 16 or other factors, the angle is preferably set as above so as to effectively cool the mixture in a gas phase state and also stabilize the thermal plasma flame 24 to efficiently operate the fine particle producing apparatus 10. The foregoing angle may be experimentally determined taking conditions such as the size of the apparatus, the size of the thermal plasma flame and the like into consideration.

When fine particles having just been generated collide with each other to form agglomerates, this causes nonuniform particle size, resulting in lower quality. In the method of producing substoichiometric titanium oxide fine particles according to the invention, since gas injected through the gas injecting port 28a in the direction indicated by arrows Q toward the tail portion (terminating portion) of the thermal plasma flame at the predetermined angle and in the predetermined supply amount dilutes the mixture in a gas phase state, the fine particles are prevented from colliding with each other and aggregating. In other words, gas injected from the gas injecting port 28a serves to rapidly cool the mixture in a gas phase state while preventing aggregation of substoichiometric titanium oxide fine particles generated, and thus plays a role in achieving both a finer particle size of substoichiometric titanium oxide fine particles and a more uniform particle size of substoichiometric titanium oxide fine particles.

In the meantime, gas injected from the gas injecting port 28a, to no small extent, adversely affects the stability of the thermal plasma flame 24. The thermal plasma flame, however, needs to be stable for continuous operation of the whole apparatus. For this purpose, the gas injecting port 28a in the fine particle producing apparatus 10 in this embodiment takes on the form of a circular slit, and the supply amount of gas can be adjusted by adjusting the width of the slit, so that uniform gas can be injected toward the center. Therefore, it can be said that the gas injecting port in the form of a circular slit has a favorable shape for stabilizing the thermal plasma flame. This adjustment can be made also by changing the supply amount of injected gas.

While the method of producing substoichiometric titanium oxide fine particles according to the invention is described above in detail, the invention is by no means limited to the foregoing embodiment and it should be understood that various improvements and modifications are possible without departing from the scope and spirit of the invention.

EXAMPLES

Examples of the method of producing substoichiometric titanium oxide fine particles according to the invention are specifically described below.

Example 1

In Example 1, using the fine particle producing apparatus 10 shown in FIG. 1, titanium dioxide powder being the raw material was dispersed in an alcohol being the carbon-containing dispersion medium at a weight ratio (in percentage) between the titanium dioxide powder and the alcohol of 50%:50%, to thereby form a slurry. Then water was added such that the weight ratio of water to the total weight of the titanium dioxide and the alcohol was 78.4%:21.6% (the weight ratio between the alcohol and the water (alcohol/water) was 1.82), thereby forming a slurry 26 containing an adjusted amount of water.

The titanium dioxide powder used as the raw material had an average particle size of 4 μm. Ethanol was used as the alcohol.

In this example, in the fine particle producing apparatus 10 shown in FIG. 1, a high frequency voltage of about 4 MHz and about 80 kVA was applied to the high frequency oscillation coil 12b of the plasma torch 12, and argon gas (Ar) and hydrogen gas ($H_2$) were supplied as the plasma gas from the plasma gas supply source 22, whereby the thermal plasma flame 24 was generated in the plasma torch 12.

The proportion between the hydrogen gas and the argon gas in the plasma gas for the thermal plasma flame 24 was adjusted such that the amount of the hydrogen gas was 0 to 20 vol % relative to the amount of the argon gas.

The supply amount of the plasma gas was adjusted such that the argon gas was supplied at a rate of 10 to 300 l/min.

The slurry 26 obtained in this example was converted into droplets together with argon gas serving as the atomizing gas and supplied into the oxygen-free thermal plasma flame 24 in the plasma torch 12.

At this time, the argon gas was supplied as the atomizing gas from the atomizing gas supply source 14e of the material supply device 14 at a rate of 10 l/min.

Thereafter, carbon generated from un unburned portion of the alcohol in the slurry 26 was converted into droplets and supplied into the thermal plasma flame 24 was reacted with the titanium dioxide raw material in the slurry 26 to partially reduce the material, thereby generating substoichiometric titanium oxide; the generated substoichiometric titanium oxide was rapidly cooled by gas supplied from the gas supply device 28 and injected from the gas injecting port 28a, to thereby obtain primary fine particles 15 made of the substoichiometric titanium oxide.

Argon gas was used as the gas supplied into the chamber 16 by the gas supply device 28. At this time, the flow rate in the chamber 16 was 5 m/sec and the supply amount was set to 1 $m^3$/min.

The thus-obtained primary fine particles 15 made of the substoichiometric titanium oxide were introduced into the cyclone 19, and then coarse particles were removed, thus obtaining nanosized secondary fine particles made of the substoichiometric titanium oxide, i.e., substoichiometric titanium oxide fine particles 18 with a uniform particle size and a specific surface area of 52.8 $m^2$/g.

The pressure in the cyclone 19 was set to 50 kPa, and the supply rate of fine particles from the chamber 16 to the cyclone 19 was set to 10 m/sec (on average).

Figure 7:
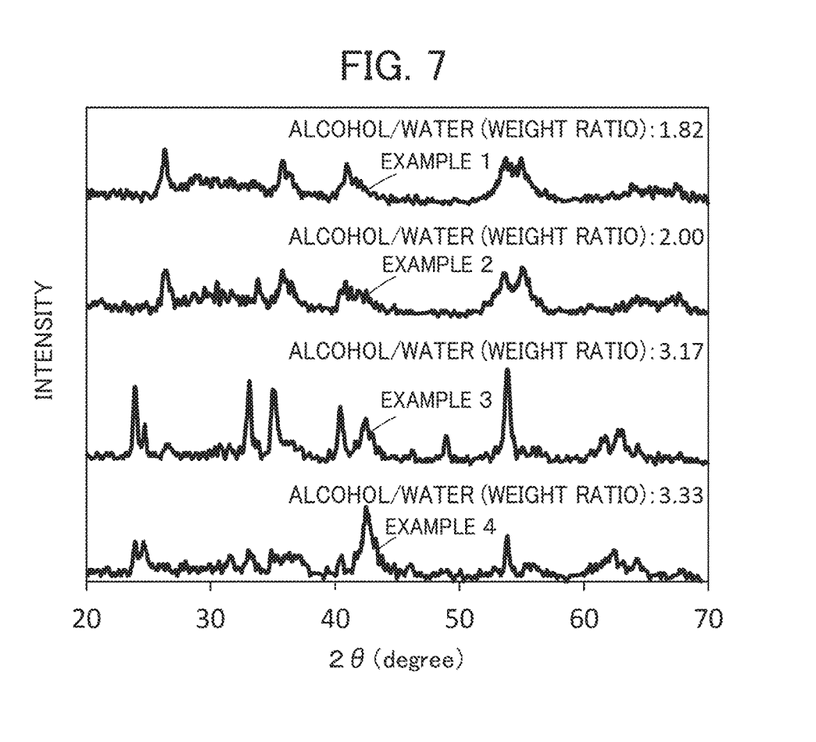
FIG. 7 is a graph showing analysis results of crystal structures as obtained by X-ray diffractometry made on substoichiometric titanium oxide fine particles in Examples of the invention
Figure 8:
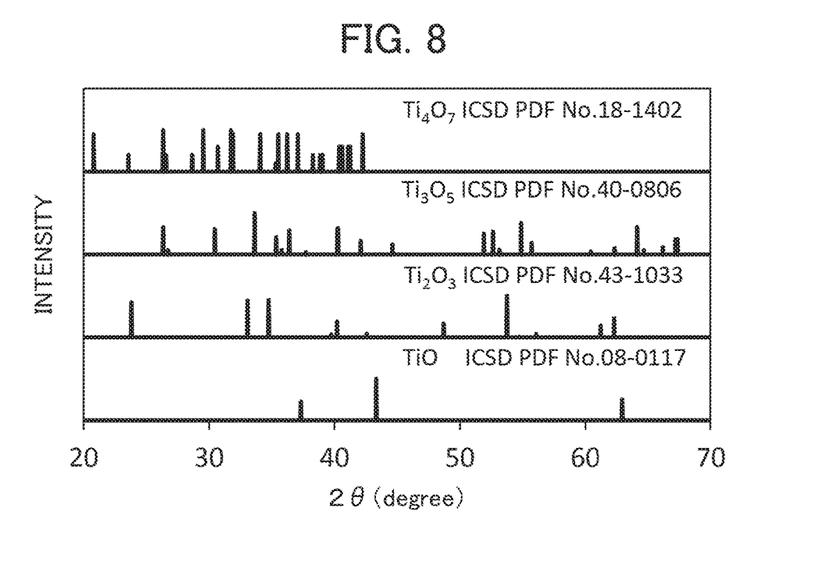
FIG. 8 is a graph showing references of crystal phases of four types of substoichiometric titanium oxides.

Next, the resulting product, i.e., the substoichiometric titanium oxide fine particles 18 in Example 1 were examined for its crystal structure using X-ray diffraction (XRD). The result is shown in FIG. 7. References of crystal phases of four types of substoichiometric titanium oxides are shown in FIG. 8. FIG. 8 shows peak positions in crystal structure analysis results of crystal phases of four types of substoichiometric titanium oxides $Ti_4O_7$, $Ti_3O_5$, $Ti_2O_3$ and TiO as specified by PDF numbers of ICSD (inorganic crystal structure database).

In addition, the substoichiometric titanium oxide fine particles 18 of Example 1 were formed into a 50 MPa green compact, and the sheet resistance thereof was measured. The sheet resistance was 0.258×$10^5$ Ω/□.

Example 2

Using the fine particle producing apparatus 10 shown in FIG. 1 as with Example 1, the procedure in Example 1 was repeated except that water was added such that the weight ratio of water to the total weight of the titanium dioxide and the alcohol was 80%:20% (the weight ratio between the alcohol and the water (alcohol/water) was 2.00), thereby forming a slurry 26 of Example 2 containing an adjusted amount of water.

As with Example 1, the slurry 26 of Example 2 thus obtained was supplied into the oxygen-free thermal plasma flame 24 in the plasma torch 12 of the fine particle producing apparatus 10 and rapidly cooled in the chamber 16 to obtain primary fine particles 15 made of substoichiometric titanium oxide. The thus-obtained primary fine particles 15 made of the substoichiometric titanium oxide were introduced into the cyclone 19, thereby obtaining nanosized secondary fine particles made of the substoichiometric titanium oxide, i.e., substoichiometric titanium oxide fine particles 18 of Example 2 with a uniform particle size and a specific surface area of 53.9 m$^2$/g.

The substoichiometric titanium oxide fine particles 18 of Example 2 thus obtained were examined for its crystal structure using X-ray diffraction (XRD) in the same manner as in Example 1. The result is shown in FIG. 7. In addition, the sheet resistance of a 50 MPa green compact made from the substoichiometric titanium oxide fine particles 18 of Example 2 was measured as with Example 1, and the sheet resistance was $0.820 \times 10^4 \Omega/\square$.

Example 3

Using the fine particle producing apparatus 10 shown in FIG. 1 as with Example 1, the procedure in Example 1 was repeated except that water was added such that the weight ratio of water to the total weight of the titanium dioxide and the alcohol was 86.4%:13.6% (the weight ratio between the alcohol and the water (alcohol/water) was 3.17), thereby forming a slurry 26 of Example 3 containing an adjusted amount of water.

From the slurry 26 of Example 3 thus obtained, nanosized secondary fine particles made of substoichiometric titanium oxide, i.e., substoichiometric titanium oxide fine particles 18 of Example 3 with a uniform particle size and a specific surface area of 58.7 m$^2$/g were obtained by means of the fine particle producing apparatus 10 in the same manner as in Example 1.

A measurement result of crystal structure of the thus-obtained substoichiometric titanium oxide fine particles 18 of Example 3 is shown in FIG. 7. In addition, the sheet resistance of a 50 MPa green compact made from the substoichiometric titanium oxide fine particles 18 of Example 3 was measured as with Example 1, and the sheet resistance was $1.632 \times 10^2 \Omega/\square$.

Example 4

Using the fine particle producing apparatus 10 shown in FIG. 1 as with Example 1, the procedure in Example 1 was repeated except that water was added such that the weight ratio of water to the total weight of the titanium dioxide and the alcohol was 87%:13% (the weight ratio between the alcohol and the water (alcohol/water) was 3.33), thereby forming a slurry 26 of Example 4 containing an adjusted amount of water.

From the slurry 26 of Example 4 thus obtained, nanosized secondary fine particles made of substoichiometric titanium oxide, i.e., substoichiometric titanium oxide fine particles 18 of Example 4 with a uniform particle size and a specific surface area of 71.8 m$^2$/g were obtained by means of the fine particle producing apparatus 10 in the same manner as in Example 1.

A measurement result of crystal structure of the thus-obtained substoichiometric titanium oxide fine particles 18 of Example 4 is shown in FIG. 7.

In Examples 1 to 4, the substoichiometric titanium oxide (TiOx (1<x<2)) fine particles were obtained while titanium carbide (TiC) was hardly generated, and were mixed phases of $Ti_2O_3$, $Ti_3O_5$, $Ti_4O_7$, $Ti_5O_9$ and the like as shown in FIG. 7 with specific surface areas ranging from 52.8 m$^2$/g to 71.8 m$^2$/g.

It can be seen that the sheet resistance was high in Example 3 in which the amount of added water was small, the sheet resistance was lower in Example 2 in which the amount of added water was larger than in Example 3, and the sheet resistance was lowest in Example 1 in which the amount of added water was largest. Thus, it can be understood that the sheet resistance can be decreased by increasing the amount of added water.

It can be understood from the foregoing facts in the examples of the present invention that, by use of a slurry prepared by mixing the titanium dioxide raw material with the alcohol and adding water to the mixture, the degree of oxidation-reduction of substoichiometric titanium oxide fine particles to be produced can be varied and the sheet resistance of produced substoichiometric titanium oxide fine particles can be decreased.

In addition, in the examples of the present invention, by adjusting the amount of water in preparation of a slurry, the degree of oxidation-reduction of substoichiometric titanium oxide fine particles to be produced can be adjusted and the sheet resistance of produced substoichiometric titanium oxide fine particles can be varied using the amount of added water.

From the foregoing, the effects of the invention are apparent.

REFERENCE SIGNS LIST

10 fine particle producing apparatus
12 plasma torch
12*a* quartz tube
12*b* high frequency oscillation coil
12*c* plasma gas supply port
14 material supply device
14*a* supply tube
14*b* container
14*c* stirrer
14*d* pump
14*e* atomizing gas supply source
14*f* slurry pipe
14*g*, 22*c*, 28*e* gas pipe
15 primary fine particle
16 chamber
16*a* inner wall (inside wall)
17 top plate
17*a* inner top plate part
17*b* outer top plate part
17*c* upper and outer top plate part
17*d* gas passage
18 fine particle (secondary fine particle)
19 cyclone
19*a* inlet tube
19*b* outer casing
19*c* truncated cone portion
19*d* coarse particle collecting chamber
19*e* inner tube
20 collecting section
20*a* collecting chamber
20*b* filter
20*c* pipe
22 plasma gas supply source
22*a*, 22*b* high-pressure gas cylinder
24 thermal plasma flame
26 slurry 28 gas supply device
28a gas injecting port
28b gas injecting port
28c compressor
28d gas supply source
28e pipe

The invention claimed is:

1. A method of producing substoichiometric titanium oxide fine particles by use of titanium oxide containing titanium dioxide, the method comprising:
    dispersing powder of the titanium dioxide in a liquid state substance containing a carbon source and then adding water to form a slurry;
    converting the slurry into droplets and then supplying the slurry into a thermal plasma flame free of oxygen;
    reacting carbon generated from the liquid state substance in the thermal plasma flame with the titanium dioxide to generate substoichiometric titanium oxide in gas phase state; and
    rapidly cooling the generated substoichiometric titanium oxide in gas phase state to thereby generate substoichiometric titanium oxide fine particles.

2. The method of producing substoichiometric titanium oxide fine particles according to claim 1,
    wherein an amount of the powder of the titanium dioxide ranges from 10 to 65 wt % with respect to a total amount of the powder of the titanium dioxide and the liquid state substance containing the carbon source,
    wherein an amount of the liquid state substance containing the carbon source ranges from 90 to 35 wt % with respect to the total amount of the powder of the titanium dioxide and the liquid state substance containing the carbon source, and
    wherein an amount of the water ranges from 5 to 40 wt % with respect to the total amount of the powder of the titanium dioxide and the liquid state substance containing the carbon source.

3. The method of producing substoichiometric titanium oxide fine particles according to claim 1, wherein an amount of the added water is adjusted to adjust a degree of oxidation-reduction of substoichiometric titanium oxide fine particles to be produced.

4. The method of producing substoichiometric titanium oxide fine particles according to claim 1, wherein the liquid state substance containing the carbon source is alcohol, ketone, kerosene, octane or gasoline.

5. The method of producing substoichiometric titanium oxide fine particles according to claim 1, wherein the thermal plasma flame is derived from at least one gas among hydrogen, helium and argon.

* * * * *